United States Patent
Gregg et al.

(10) Patent No.: US 6,918,849 B2
(45) Date of Patent: Jul. 19, 2005

(54) POWER TRANSMISSION BELT CONTAINING CHOPPED CARBON FIBERS

(75) Inventors: Michael John William Gregg, Lincoln, NE (US); Thomas George Burrowes, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 70 days.

(21) Appl. No.: 10/098,079

(22) Filed: Mar. 14, 2002

(65) Prior Publication Data

US 2003/0050143 A1 Mar. 13, 2003

Related U.S. Application Data

(60) Provisional application No. 60/276,585, filed on Mar. 16, 2001.

(51) Int. Cl.$^7$ .............................. F16G 5/04; F16G 1/04; B32B 9/00
(52) U.S. Cl. ....................... 474/263; 260/264; 260/237; 156/137; 428/367
(58) Field of Search ............................... 474/263, 260, 474/266, 264, 271, 268, 262, 202, 205, 204; 428/367, 390, 391, 575; 525/328.3, 338, 343, 387, 397; 524/427, 451, 494; 156/137–139

(56) References Cited

U.S. PATENT DOCUMENTS

| | | | |
|---|---|---|---|
| 3,778,396 A | 12/1973 | Fujimoto et al. | 260/27 |
| 4,024,773 A | 5/1977 | Harmann et al. | 74/233 |
| 4,127,039 A * | 11/1978 | Hollaway, Jr. | 474/263 |
| 4,197,279 A | 4/1980 | Saito et al. | 423/265 |
| 4,235,119 A | 11/1980 | Wetzel | 474/205 |
| 4,347,279 A | 8/1982 | Saji et al. | 428/294 |
| 4,397,831 A | 8/1983 | Saito et al. | 423/447.6 |
| 4,474,906 A | 10/1984 | Nakama et al. | 523/205 |
| 4,509,938 A | 4/1985 | Woodland | 474/264 |
| 4,522,801 A | 6/1985 | Yoshinari et al. | 423/447.4 |

(Continued)

FOREIGN PATENT DOCUMENTS

| | | | | |
|---|---|---|---|---|
| EP | 0 881 312 A2 | * | 12/1998 | D01F/9/145 |
| JP | 06-117497 A | * | 4/1994 | 474/263 |
| JP | 07-208558 A | * | 8/1995 | F16G/1/28 |
| JP | 2002-88195 A | * | 3/2002 | F16G/1/06 |
| WO | 0216801 | | 2/2002 | F16G/5/06 |

OTHER PUBLICATIONS

Zolteck Company and Product Overview 1999 brochure, Zoltek Companies, Inc., 3101 McKelvey Road, St. Louis, Missouri 63044.
Patent Abstracts of Japan, vol. 2000, No. 13, Feb. 5, 2001, JP 2000 303362 A.
European Search Report.

*Primary Examiner*—Marcus Charles
(74) *Attorney, Agent, or Firm*—John D. DeLong

(57) ABSTRACT

An endless power transmission belt having
(1) a tension section;
(2) a cushion section; and
(3) a load-carrying section disposed between the tension section and cushion section; and the belt containing an elastomeric composition comprising
   (a) cross-linked elastomer; and
   (b) from 5 to 60 phr of chopped carbon fibers that have a sizing agent applied to the surface of the fibers.

18 Claims, 1 Drawing Sheet

U.S. PATENT DOCUMENTS

| | | | |
|---|---|---|---|
| 4,571,230 A | 2/1986 | Woodland | 474/264 |
| 4,740,192 A | 4/1988 | Mashimo et al. | 474/263 |
| 4,808,149 A | 2/1989 | Standley | 474/260 |
| 4,871,004 A | 10/1989 | Brown et al. | 152/209 |
| 4,880,881 A * | 11/1989 | Minami | 525/438 |
| 5,007,884 A | 4/1991 | Masuda et al. | 474/242 |
| 5,209,705 A | 5/1993 | Gregg | 474/204 |
| 5,227,238 A | 7/1993 | Hirai et al. | 428/367 |
| 5,244,436 A | 9/1993 | Kurokawa | 474/260 |
| 5,421,789 A | 6/1995 | Gregg | 474/153 |
| 5,610,217 A * | 3/1997 | Yarnell et al. | 524/397 |
| 5,807,194 A | 9/1998 | Knutson et al. | 474/268 |
| 6,066,395 A * | 5/2000 | Miyoshi et al. | 428/367 |
| 6,086,500 A * | 7/2000 | Yamada et al. | 474/268 |
| 6,132,328 A * | 10/2000 | Kinoshita et al. | 474/260 |
| 6,177,202 B1 * | 1/2001 | Takehara et al. | 428/515 |
| 6,296,588 B1 * | 10/2001 | Ciemniecki et al. | 474/268 |
| 6,358,171 B1 * | 3/2002 | Whitfield | 474/266 |
| 6,548,604 B1 * | 4/2003 | Kotsuji et al. | 525/328.3 |

* cited by examiner

POWER TRANSMISSION BELT CONTAINING CHOPPED CARBON FIBERS

CROSS-REFERENCE TO RELATED APPLICATIONS

The Applicants hereby incorporate by reference prior U.S. Provisional Application Ser. No. 60/276,585, filed on Mar. 16, 2001.

BACKGROUND OF THE INVENTION

U.S. Pat. No. 3,778,396 discloses a rubber composition comprising rubber reinforced by distributing therein carbon fibers, carbon black and softener. Vulcanized rubbers made from this rubber composition are disclosed as being useful for tires and conveyor belts.

U.S. Pat. No. 4,740,192 discloses a power transmission belt wherein a portion thereof is formed as a composition of 1 to 100 parts by weight of whiskers distributed in 100 parts by weight of rubber. The whiskers may be formed of one or more of alpha-silicon carbide, beta-silicon carbide, silicon nitride, alpha-alumina, titanium oxide, zinc oxide, tin oxide, graphite, iron, copper or nickel. Where cut fiber is utilized, it may be formed of cotton, nylon and polyester.

U.S. Pat. Nos. 4,509,938 and 4,571,230 disclose a power transmission belt where the tension section and the compression section have a plurality of randomly arranged fibers embedded in the compounds with the axes of the fibers being disposed substantially traversed to the longitudinal axis of the belt.

U.S. Pat. No. 4,808,149 relate to a power transmission belt, which may contain zero to 30 phr of a fiber such as polyaramide or graphite, having a length of from 20 to 42 microns in length.

SUMMARY OF THE INVENTION

The present invention relates to a power transmission belt that is characterized by a free radically cured elastomeric composition comprising a crosslinked rubber and from 5 to 60 phr of chopped carbon fiber that has been treated with a sizing agent.

BRIEF DESCRIPTION OF THE FIGURES

The accompanying figure shows embodiments of this invention in which.

DETAILED DESCRIPTION OF THE INVENTION

There is disclosed an endless power transmission belt having
 (1) a tension section;
 (2) a cushion section; and
 (3) a load-carrying section disposed between the tension section and cushion section; and the belt containing an elastomeric composition comprising
  (a) a cross-linked rubber; and
  (b) from 5 to 60 phr of chopped carbon fiber that has been treated with a sizing agent.

The present invention relates to a new and improved power transmission belt. The power transmission belt of the present invention may be embodied in accordance with the two conventional-type of designs of power transmission belt. In the first design, the cushion section is reinforced with chopped carbon fiber. In the second design, the load carrying and/or tension section is reinforced with chopped carbon fiber.

Figure 1:
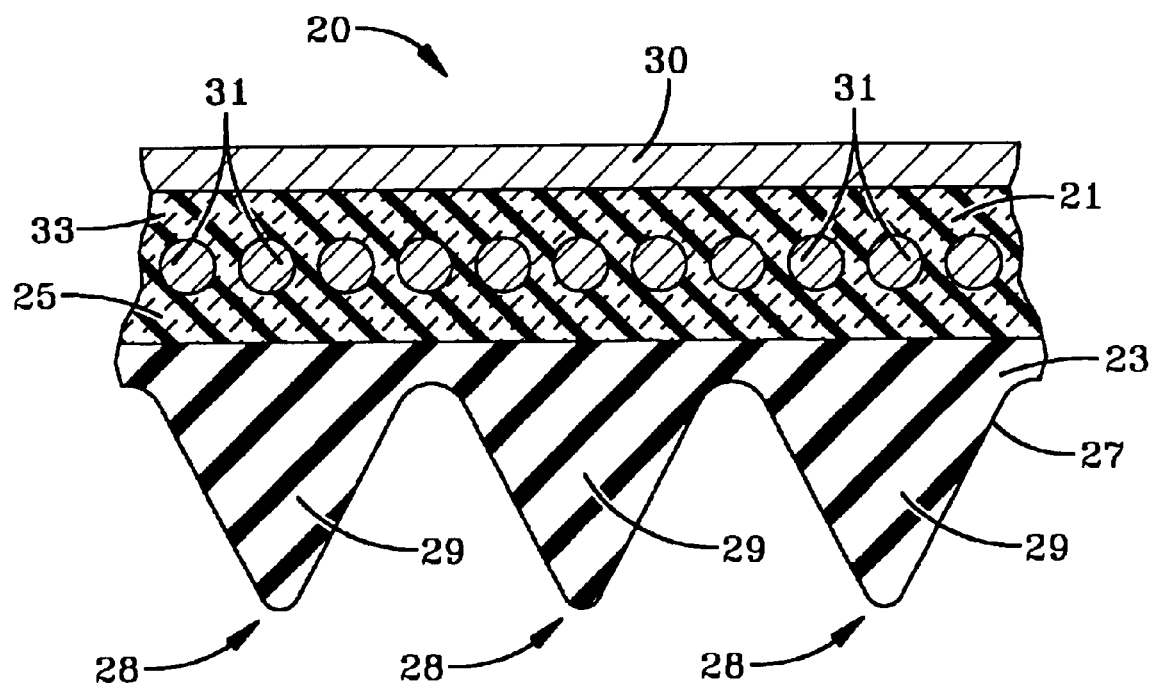
FIG. 1 is a fragmentary perspective view illustrating one embodiment of an endless power transmission belt of this invention.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may have the drive surface 28 comprising multiple ribs 29 or Vs. The belt 20 of FIG. 1 has a fabric backing 30, however, in lieu of a fabric backing, a fiber loaded rubber may be used. The fabric backing 30 may be bidirectional, non-woven, woven or knitted fabric. The fabric backing layer 30 may be frictioned, dipped, spread, coated or laminated.

The load-carrying section 25 has load-carrying means in the form of load-carrying cords 31 or filaments which are suitably embedded in an elastomeric cushion or matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The drive surface 28 of the belt 20 of FIG. 1 is multi-V-grooved. In accordance with other embodiments, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. Preferably, the belt 20 has one drive surface.

The elastomeric compositions for use in the tension section 21, cushion section 22 and load carrying section 23 may be the same or different.

The elastomeric composition for use in the tension section 21, load carrying section 23 and/or cushion section 22 contains a cross-linked elastomer or rubber. Such rubber may be selected from the group consisting of ethylene alpha olefin rubber, silicone rubber, polychloroprene, polybutadiene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, and mixtures thereof. The preferred rubbers are EPDM, hydrogenated acrylonitrile rubber, natural rubber, polybutadiene and styrene-butadiene rubber.

The ethylene-alpha-olefin elastomer includes copolymers composed of ethylene and propylene units (EPM), ethylene and butene units, ethylene and pentene units or ethylene and octene units (EOM) and terpolymers composed of ethylene and propylene units and an unsaturated component (EPDM), ethylene and butene units and an unsaturated component, ethylene and pentene units and an unsaturated component, ethylene and octene units and an unsaturated component, as well as mixtures thereof. As the unsaturated component of the terpolymer, any appropriate non-conjugated diene may be used, including, for example, 1,4-hexadiene, dicyclopentadiene or ethylidenenorbornene (ENB). The ethylene-alpha-olefin elastomer preferred in the present invention contains from about 35 percent by weight to about 90 percent by weight of the ethylene unit, from about 65 percent by weight to about 5 percent by weight of the propylene or octene unit and 0 to 10 percent by weight of the unsaturated component. In a more preferred embodiment, the ethylene-alpha-olefin elastomer contains from about 50 percent to about 70 percent by weight of the ethylene unit and, in a most preferred embodiment, the ethylene-alpha-olefin elastomer contains from about 55 percent to about 65 percent of the ethylene unit. The most preferred ethylene-alpha-olefin elastomer is EPDM.

The cross-linked elastomeric composition contains from 5 to 60 phr of chopped carbon fibers treated with a sizing agent. Preferably, from 5 to 35 phr of chopped carbon fiber are present. The cross-linked elastomer containing the carbon fiber may be used in the tension section, load carrying section and/or cushion section.

The carbon fibers may be prepared from a starting material including polyacrylonitrile (PAN), cool tar pitch, rayon petroleum pitch, cool liquefied material or the like. For example, the carbon fiber may be manufactured by known methods, such as disclosed in U.S. Pat. Nos. 4,197,279, 4,397,831, 4,347,279, 4,474,906 and 4,522,801. When carbon fiber is produced from PAN, PAN fiber is preoxidized in an oxidizing atmosphere (e.g., air) at about 200° C. to 300° C. and then the thus obtained fiber is carbonized at about from 500° C. to 3,000° C. in an inert atmosphere (e.g., $N_2$ He) to obtain the desired carbon fiber.

The chopped carbon fibers for use in the present invention may range from 0.001 mm to 0.05 mm in diameter. Preferably, the fibers range from 0.002 mm to 0.012 mm in diameter.

As to the length, the chopped carbon fibers range from 0.5 mm to 75 mm. Preferably the chopped fibers range in length of from 1 mm to 10 mm.

Commercially available sources of chopped carbon fibers include a product marketed under the designation PANEX® 33 by Zoltek Company. These fibers are available with an epoxy resin as the sizing. The fibers are available in length of 3.17 and 6.35 mm.

It is critical to have a sizing agent applied to the chopped carbon fiber. The sizing agent may be a thermoplastic resin, a thermosetting resin or a mixture thereof at any proportion including epoxy resins, urethane-modified epoxy resins, polyester resins, phenol resins, polyamide resins, polyurethane resins, polycarbonate resins, polyetherimide resins, polyamideimide resins, polystyrylpyridine resins, polyimide resins, bismaleimide resins, polysulfone resins, polyethersulfone resins, epoxy-modified urethane resins, polyvinyl alcohol resins, polyvinyl pyrrolidone resins, and modified forms of the above resins (a part of the terminal residues of a polymer or a part of the side chains of a polymer are modified, for example, a polyolefin is grafted with acrylic acid or maleic acid) or mixtures thereof. The preferred sizing agent is an epoxy resin. A particularly preferred epoxy resin is a bisphenol-A/epichlorohydrin based epoxy. When a thermosetting resin is used as a sizing agent, the chopped strands should not be subjected to curing conditions (temperature and time) for the resin until the dispersion of filaments of the chopped strands is completed. It is believed that PANEX® 33 has an epoxy resin as the sizing agent.

The sizing agent may be applied to the carbon fiber strand by passing the strand through a solution or an emulsion of the sizing agent or through the sizing agent in a molten state. The sizing agent may also be applied to a strand in the state of fine particles and then heat melted at a temperature of from the melting point of the sizing agent to the decomposition point thereof. In order to make the penetration complete, a pressure may be added to the sizing agent melted, for example, by passing through a die. The average diameter of the fiber is preferably 1 to 50 $\mu$m.

The sizing agent should penetrate into the fiber strand uniformly. The temperature of the solution or the emulsion is generally from 10° C. to 50° C. The concentration of the resin solution or the emulsion is generally from 0.5 to 30 weight percent, preferably from 2 to 20 weight percent, more preferably from 5 to 10 weight percent based on solution or emulsion weight.

The solvent solution is selected, suitably depending on a kind of the sizing agent, from water; alcohols such as ethyl alcohol and methyl alcohol; ketones such as acetone and methyethyl ketone; xylene, dichloromethane, N-methyl pyrrolidone, dimethyl formamide, tetrahydrofuran, toluene and the like, and compatible mixtures thereof. As a medium for the emulsion usually water is used, and a surfactant is used therewith, if desired.

During the penetration with the solution or the emulsion, the carbon fiber strand is applied with a tension generally of from 100 to 5,000 grams per strand, and preferably of from 500 to 2,000 grams per strand.

Generally, the amount of the sizing agent in the carbon fiber strand depends on the tension applied to the carbon fiber strand, twisting degree of carbon fiber strand and the sizing agent concentration in the solution or the emulsion.

The carbon fiber strand impregnated with a solution of sizing agent is subjected to drying, normally in air. To conduct the drying, the strand may be heated to the temperature of the boiling point of the solvent. The temperature should not be higher than the decomposition point and when a thermosetting resin is used as a sizing agent, the heating temperature should be lower than the curing temperature of the resin. The drying is usually conducted until the weight of the solvent in the sizing agent becomes less than 0.1 weight percent based on the total weight of the sizing agent and that of the solvent therein. When the sizing agent is applied in a molten state, the carbon fiber strand impregnated with the resin may be cooled until the resin becomes non-tacky or is solidified.

When the carbon fiber strand is impregnated with a solution of the sizing agent, the carbon fiber strand impregnated with the sizing agent preferably is provided with zero twists.

The amount of the sizing agent on the chopped carbon fiber is in the range of from 1 percent to 10 percent by weight, preferably from 3 percent to 8 percent by weight of the chopped fiber.

The thus prepared sized carbon fiber stand is then cut into a proper length.

The elastomeric composition containing the cross-linked elastomer and treated chopped carbon fiber may be used in the tension section 21, cushion section 23, and/or load carrying sections 22 of the belt. Preferably, the elastomeric composition is used in the cushion section 23.

The elastomeric compositions containing the treated carbon fiber may be cross-linked by sulfur, UV cure or peroxide cure system. Well-known classes of peroxides that may be used include diacyl peroxides, peroxyesters, dialkyl peroxides and peroxyketals. Specific examples include dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, $\alpha,\alpha'$-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. The preferred peroxide is $\alpha,\alpha'$-bis(t-butylperoxy) diisopropylbenzene. Typical amounts of peroxide ranges from 1 to 12 phr (based on active parts of peroxide). Preferably, the amount of peroxide ranges from 2 to 6 phr.

A coagent is present during the free radical crosslinking reaction. Coagents are monofunctional and polyfunctional unsaturated organic compounds which are used in conjunction with the free radical initiators to achieve improved vulcanization properties. Representative examples include organic acrylates, organic methacrylates, divinyl esters, divinyl benzene, bis-maleimides, triallylcyanurates, polyalkyl ethers and esters, metal salts of an alpha-beta unsaturated organic acid and mixtures thereof.

The coagent may be present in a range of levels. Generally speaking, the coagent is present in an amount ranging from 0.1 to 40 phr. Preferably, the coagent is present in an amount ranging from 2 to 15 phr.

As mentioned above, one class of coagents are acrylates and methacrylates. Representative examples of such coagents include di-, tri-, tetra- and penta-functional acrylates, di-, tri-, tetra- and penta-functional methacrylates and mixtures thereof. Specific examples of such coagents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropylene glycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris (2-hydroxy ethyl) isocyanurate triacrylate, tris (2-hydroxy ethyl) isocyanurate triacrylate, and tris (2-hydroxy ethyl) isocyanurate trimethacrylate.

The metal salts of $\alpha,\beta$-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum. Zinc diacrylate and zinc dimethacrylate are preferred.

The elastomeric composition for use in the coating layer may be cured with a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the remaining ingredients in the coating and the particular type of sulfur vulcanizing agent that is used. Generally speaking, the amount of sulfur vulcanizing agent ranges from about 0.1 to about 8 phr with a range of from about 1.0 to about 3 being preferred.

Accelerators may be used to control the time and/or temperature required for vulcanization of the coating. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Conventional carbon blacks may also be present in the composition. Such carbon blacks are used in conventional amounts ranging from 5 to 250 phr. Preferably, the carbon blacks are used in an amount ranging from 20 to 100 phr. Representative examples of carbon blacks which may be used include those known by their ASTM designations N110, N121, N242, N293, N299, S315, N326, N330, M332, N339, N343, N347, N351, N358, N375, N550, N582, N630, N624, N650, N660, N683, N754, N762, N907, N908, N990, N991 and mixtures thereof.

It is readily understood by those having skill in the art that the rubber composition would be compounded by methods generally known in the rubber compounding art, such as mixing the various constituent rubbers with various commonly used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

Various non-carbon black fillers and/or reinforcing agents may be added to increase the strength and integrity of the rubber composition for making the power transmission belt of the present invention. An example of a reinforcing agent is silica. Silica may be used in the present composition in amounts from about 0 to 80 parts, and preferably about 10 to 20 parts, by weight based on 100 parts of rubber.

In addition to the chopped carbon fibers, the elastomer composition may also contain additional fibers or flock. The optional fibers or flock to be distributed throughout the elastomer mix may be any suitable material and is preferably non-metallic fibers such as cotton or fibers made of a suitable synthetic material include aramid, nylon, polyester, PTFE, fiberglass, and the like. Each fiber may have a diameter ranging between 0.001 inch to 0.050 inch (0.025 mm to 1.3 mm) and length ranging between 0.001 inch to 0.5 inch (0.025 mm to 12.5 mm). The fibers may be used in an amount ranging from 5 to 50 phr.

In addition to the above, solid inorganic lubricants may be present in the elastomer composition. Representative examples of such lubricants include molybdenum disulfide, PTFE, molybdenum diselenide, graphite, antimony trioxide, tungsten disulfide, talc, mica, tungsten diselenide and mixtures thereof. The amount of such solid inorganic lubricants, if used, will generally range from 1 to 25 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition for use in the belt is generally carried out at conventional temperatures ranging from about 160° C. to 190° C. Preferably, the curing is conducted at temperatures ranging from about 170° C. to 180° C.

Figure 2:
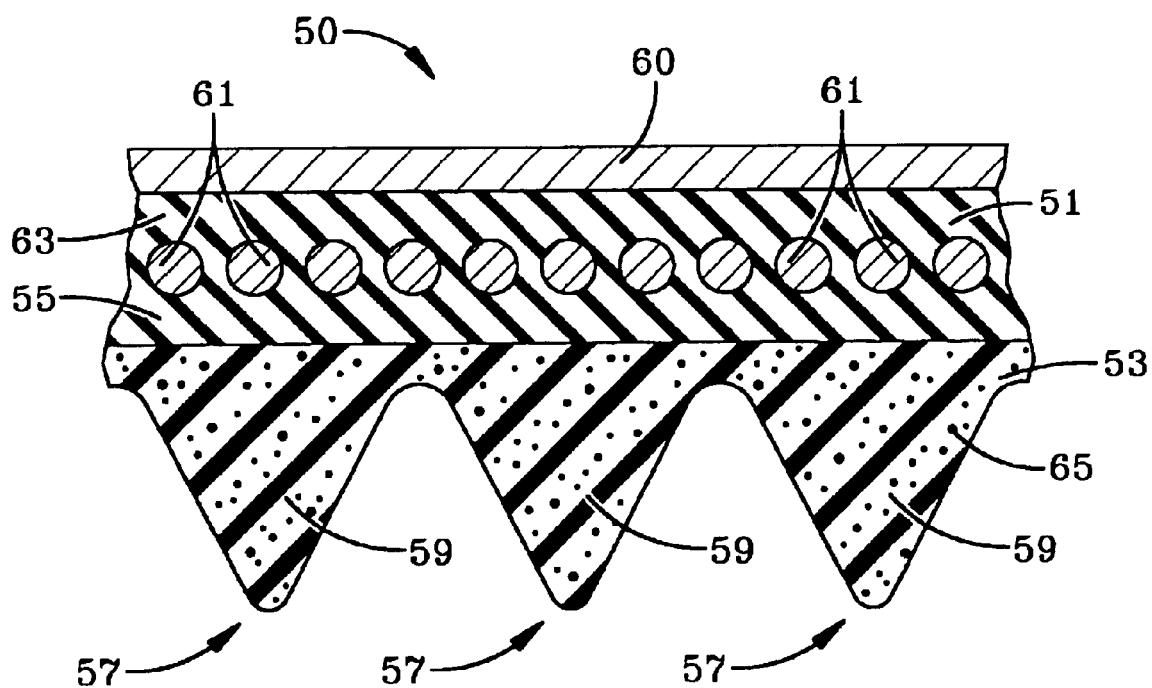
FIG. 2 is a fragmentary perspective view illustrating one embodiment of an endless power transmission belt of this invention.

Referring to FIG. 2, there is shown an endless power transmission belt 50 according to another embodiment. Similar to the belt 20 of FIG. 1, the belt 50 comprises a tension section 51, a cushion section 53 and a load-carrying section 55 disposed between the tension section 51 and cushion section 53. The belt 50 of FIG. 1 has a plurality of ribs 59 or Vs and a fabric-backing 60. The load-carrying section 55 has load-carrying means in the form of load-carrying cords 61 or filaments which are embedded in an elastomeric matrix 63. The elastomeric compound located in the cushion section 53 is illustrated as containing chopped carbon fibers.

As known to those skilled in the art, power transmission belts may be built on a drum device. First, the backing is applied to drum as a sheet. Next, any tension section is applied as a sheet followed by spiralling onto the drum the cord or tensile members (load-carrying section). Thereafter, the cushion section is applied and followed by the fabric, if used. The assembled laminate or slab and drum are placed in a mold and cured. After cure, ribs are cut into the slab and the slab cut into belts in a manner known to those skilled in the art.

The invention is further illustrated by the following nonlimiting examples.

EXAMPLES

In the following examples, physical tests were conducted for uncured and molded compounds. Properties of the vulcanized rubbers were measured according to the following test protocols: MDRs by ASTM D5289-95; hardness by ASTM D2240-97; specific gravity by ASTM D297-93; tear die C strength by ASTM D624-98; tensile properties by ASTM D412-98a; with the modification that the rate of grip separation was 152 mm per minute to accommodate the fiber loading of the belts (see U.S. Pat. No. 5,610,217); and dynamic testing data by ASTM D5992-96. The fiber orientation was assessed by the ratio of the physical properties in the with direction (machine direction) to the physical properties in the against direction (perpendicular to the machine direction).

Example I

In this example, chopped carbon fiber with and without sizing were evaluated in a sulfur cured SBR/natural rubber compound particularly suited for use in the load-carrying section of a belt.

Rubber compositions containing the materials set out in Table 1 were prepared in a BR Banbury™ mixer using two separate stages of addition (mixing); namely one non-productive mix stage and one productive mix stage.

Rubber compositions containing the materials set out in Table 1 were prepared in a BR Banbury™ mixer using two separate stages of addition (mixing); namely one non-productive mix stage and one productive mix stage. Samples 1, 2, and 3 also contained conventional compounding ingredients, e.g., processing oil, sulfur, stearic acid, zinc oxide, antidegradants, and accelerator(s), in addition to the ingredients in Table 1. The compositions were identical except for the presence of chopped carbon fiber in Samples 2 and 3.

The rubber compositions are identified herein as Samples 1 through 3. Samples 3 is considered herein as representative of the present invention. Samples 1 and 2 are considered as the control due to the absence of chopped carbon fiber with sizing.

The samples were cured at about 151° C. for about 30 minutes. The samples tested for their dynamic properties were cured an additional 15 minutes.

Table 2 illustrates the behavior and physical properties of the cured Samples 1 through 3.

TABLE 1

| Sample | 1 | 2 | 3 |
|---|---|---|---|
| SBR | 70 | 70 | 70 |
| Natural rubber | 30 | 30 | 30 |
| Carbon black | 50 | 50 | 50 |
| Silica | 20 | 20 | 20 |
| Chopped carbon with sizing[1] | 0 | 0 | 20 |
| Chopped carbon w/out sizing[2] | 0 | 20 | 0 |

[1]Chopped carbon fiber commercially available from Zoltec Industries Inc. under the designation PANEX ® PX33CF0250 having an epoxy resin sizing and the fibers had a length of 6.35 mm.
[2]Chopped carbon fiber commercially available from Zoltec Industries Inc. as PX33CF0250-1 with no sizing and the fibers had a length of 6.35 mm.

TABLE 2

| Sample | Control 1 | 2 | 3 |
|---|---|---|---|
| Hardness, Shore A | 68 | 76 | 80 |
| Specific gravity | 1.19 | 1.23 | 1.23 |
| Tear Strength, Die C - Against | | | |
| Peak stress (kN/m) | 31.2 | 30.4 | 33 |
| Tear Strength, Die C - With | | | |
| Peak stress (kN/m) | 37.2 | 35.1 | 36.2 |
| Tensile Strength (152 mm/min) - Against | | | |
| Peak stress (MPa) | 17.08 | 13.02 | 12.48 |
| Elongation (%) | 520 | 442 | 417 |
| 5% modulus (MPa) | 0.4 | 0.45 | 0.59 |
| 10% modulus (MPa) | 0.6 | 0.71 | 0.86 |
| 15% modulus (MPa) | 0.74 | 0.92 | 1.07 |
| 20% modulus (MPa) | 0.87 | 1.09 | 1.25 |
| 25% modulus (MPa) | 0.97 | 1.23 | 1.39 |
| 50% modulus (MPa) | 1.38 | 1.78 | 1.95 |
| 100% modulus (MPa) | 2.27 | 2.84 | 2.93 |
| 200% modulus (MPa) | 5.16 | 5.19 | 5.1 |
| 300% modulus (MPa) | 8.88 | 8.53 | 8.54 |
| 400% modulus (MPa) | 12.69 | 11.38 | 11.84 |
| Tensile Strength (152 mm/min) - With | | | |
| Peak stress (MPa) | 17.01 | 15.97 | 17.59 |
| Elongation (%) | 484 | 439 | 459 |
| 5% modulus (MPa) | 0.43 | 1.45 | 1.83 |
| 10% modulus (MPa) | 0.62 | 2.44 | 3.08 |
| 15% modulus (MPa) | 0.78 | 3.38 | 4.16 |
| 20% modulus (MPa) | 0.9 | 4.1 | 4.82 |
| 25% modulus (MPa) | 1.01 | 4.55 | 5.02 |
| 50% modulus (MPa) | 1.46 | 4.59 | 4.51 |
| 100% modulus (MPa) | 2.49 | 4.44 | 4.46 |
| 200% modulus (MPa) | 5.76 | 6.7 | 6.9 |
| 300% modulus (MPa) | 9.71 | 10.76 | 11.08 |
| 400% modulus (MPa) | 13.68 | 14.65 | 15.22 |
| Ratio With/Against Tensile Test T10 (152 mm/min) | | | |
| Peak stress | 0.9958 | 1.2265 | 1.4101 |
| Elongation (%) | 0.9308 | 0.9932 | 1.1007 |
| 5% modulus | 1.0727 | 3.1806 | 3.091 |
| 10% modulus | 1.03 | 3.4351 | 3.6016 |
| 15% modulus | 1.0551 | 3.6712 | 3.8923 |
| 20% modulus | 1.0429 | 3.7557 | 3.8538 |
| 25% modulus | 1.0333 | 3.7056 | 3.6105 |
| 50% modulus | 1.0549 | 2.5796 | 2.3179 |
| 100% modulus | 1.0953 | 1.5666 | 1.5257 |
| Dynamic Properties | | | |
| Dynamic Stiffness | | | |
| 10 Hz (kN/m) | 346.04 | 649.66 | 703.76 |
| 20 Hz (kN/m) | 364.59 | 677.59 | 740.04 |
| 30 Hz (kN/m) | 370.44 | 689.62 | 751.44 |
| 40 Hz (kN/m) | 376.89 | 696.57 | 763.72 |
| 50 Hz (kN/m) | 373.62 | 702.4 | 780.77 |
| 60 Hz (kN/m) | 367.42 | 708.58 | 784.67 |
| 70 Hz (kN/m) | 379.51 | 718.59 | 791.72 |
| 80 Hz (kN/m) | 379.4 | 723.78 | 796.62 |
| Tan Delta | | | |
| 10 Hz | 0.2798 | 0.2497 | 0.2427 |
| 20 Hz | 0.2791 | 0.2477 | 0.239 |
| 30 Hz | 0.2823 | 0.2478 | 0.2384 |
| 40 Hz | 0.2807 | 0.2468 | 0.238 |
| 50 Hz | 0.279 | 0.2454 | 0.2475 |
| 60 Hz | 0.2733 | 0.2467 | 0.2377 |
| 70 Hz | 0.2753 | 0.2446 | 0.2386 |
| 80 Hz | 0.2745 | 0.2433 | 0.2435 |
| Total Energy | | | |
| 10 Hz (J) | 0.057 | 0.0975 | 0.1032 |
| 20 Hz (J) | 0.0607 | 0.1012 | 0.107 |
| 30 Hz (J) | 0.0625 | 0.4036 | 0.109 |
| 40 Hz (J) | 0.0623 | 0.1029 | 0.1092 |
| 50 Hz (J) | 0.0617 | 0.1031 | 0.1158 |
| 60 Hz (J) | 0.0591 | 0.103 | 0.1098 |
| 70 Hz (J) | 0.0604 | 0.1026 | 0.1117 |
| 80 Hz (J) | 0.0603 | 0.1024 | 0.1111 |

The above data demonstrates that use of Sample 3 would result in a power transmission belt having improved properties versus use of Control Samples 1 and 2. For example, dynamic stiffness is a property in which higher values are desired because the higher the values the more resistant the belt will be to turning over in its pulleys. Looking at the dynamic stiffness values for Sample 3, one can see higher values are obtained versus the Controls. Modulus values at low extension (5 to 20 percent modulus values) are considered an indication of belt durability. As can be seen, higher modulus values are obtained with Sample 3 (the present invention) versus Control Samples 1 and 2, implying improved durability for the belts of the present invention.

Example II

In this example, chopped carbon fibers with and without sizing were evaluated in a peroxide cured EPDM compound. Samples of an EPDM compound were prepared as indicated in Table 3. Samples 1 through 5 also contained conventional compounding ingredients, e.g., processing oil, cure coagents, antidegradants, lubricants and peroxide in addition to the ingredients in Table 3. The compositions were identical except for the presence of chopped carbon fiber with sizing in Samples 2 through 5, and aramid fiber in Sample 1.

The rubber compositions are identified herein as Samples 1 through 3. Samples 2, 3, 4 and 5 are considered herein as representative of the present invention. Sample 1 are considered as the control due to the absence of chopped carbon fiber with sizing.

Samples were prepared following the procedures of Example 1. Physical properties are given in Table 4.

TABLE 3

| Sample | Control No. 1 | No. 2 | No. 3 | No. 4 | No. 5 |
|---|---|---|---|---|---|
| EPDM | 100 | 100 | 100 | 100 | 100 |
| Carbon black | 40 | 40 | 40 | 40 | 40 |
| Cotton flock | 16.5 | 16.5 | 16.5 | 16.5 | 16.5 |
| Aramid fiber[1] | 7.2 | 0 | 0 | 0 | 0 |
| Chopped carbon fiber with sizing[2] | 0 | 10 | 20 | 0 | 0 |
| Chopped carbon fiber with sizing[3] | 0 | 0 | 0 | 10 | 20 |

[1]T-320 chopped aramid fiber, 1 mm, 2 denier, commercially available Technora
[2]PX33CF0125-13, 3.2 mm long
[3]PX33CF0250-14, 6.35 mm long

TABLE 4

| Sample | Control No. 1 | No. 2 | No. 3 | No. 4 | No. 5 |
|---|---|---|---|---|---|
| MDR (30 minutes at 340° F.) | | | | | |
| Test temperature | 340 | 340 | 340 | 340 | 340 |
| Test time (minutes) | 30 | 30 | 30 | 30 | 30 |
| ML (dNm) | 3.03 | 3.03 | 3.2 | 3.31 | 3.3 |
| MH (dNm) | 41.63 | 42.59 | 45.09 | 59.3 | 57.68 |
| Ts1 (minutes) | 0.39 | 0.4 | 0.37 | 0.37 | 0.35 |
| T90 (minutes) | 11.05 | 11.33 | 11.2 | 12.698 | 11.38 |
| S' at T90 | 37.77 | 38.63 | 40.9 | 53.7 | 52.24 |
| Rh (dNm/min) | 15.63 | 15.07 | 16.33 | 19.47 | 19.12 |
| RPA Ply V Strain Sweep | | | | | |
| T90 (minutes) | 1.85 | 1.91 | 1.93 | 2.1 | 1.95 |
| Max S' (kN/m) | 0.004 | 0.003 | 0.004 | 0.005 | 0.005 |
| ASTM D22 (30 minutes at 340° F.) | | | | | |
| Hardness, Shore A | 89 | 89 | 90 | 92 | 92 |
| Hot air aging 168 hours at 302° F. | | | | | |
| Hardness, Shore A | 91 | 90 | 91 | 92 | 93 |
| Tear Strength, Die C - Against | | | | | |
| Peak stress (kN/m) | 42.89 | 38.52 | 32.94 | 27.65 | 27.80 |
| Break stress (kN/m) | 40.76 | 36.83 | 30.92 | 25.20 | 25.36 |
| Tear Strength, Die C - Sheet | | | | | |
| Peak stress (kN/m) | 43.95 | 40.82 | 41.28 | 35.53 | 39.78 |
| Break stress (kN/m) | 17.02 | 15.27 | 16.70 | 0.00 | 19.35 |
| Tensile Strength (152 mm/min) - Against | | | | | |
| Peak stress (MPa) | 12.282 | 13.723 | 13.888 | 14.928 | 13.423 |
| Peak Strain (%) | 208 | 220 | 234 | 143 | 147 |
| Break stress (MPa) | 12.282 | 13.71 | 13.876 | 14.903 | 13.401 |
| Elongation (%) | 208 | 219 | 233 | 142 | 147 |
| 5% modulus (MPa) | 1.057 | 1.045 | 1.066 | 1.37 | 1.457 |
| 10% modulus (MPa) | 1.697 | 1.628 | 1.691 | 2.292 | 2.33 |
| 15% modulus (MPa) | 2.2 | 2.061 | 2.189 | 3.056 | 3.092 |
| 20% modulus (MPa) | 2.628 | 2.455 | 2.606 | 3.751 | 3.72 |
| 25% modulus (MPa) | 3.043 | 2.808 | 2.988 | 4.359 | 4.304 |
| 50% modulus (MPa) | 4.904 | 4.408 | 4.691 | 7.066 | 6.706 |
| 100% modulus (MPa) | 7.672 | 7.487 | 7.644 | 11.702 | 10.535 |
| 200% modulus (MPa) | 12.004 | 13.102 | 12.81 | 0 | 0 |
| Moncrief flex ratio (original) | 35.45 | 40.33 | 43.13 | 3.72 | 14.31 |
| 168 hours at 302° F. | 13.77 | 21.76 | 25.6 | 7.19 | 6.35 |
| Percent retained | 39 | 54 | 59 | 52 | 44 |
| Hot Air Aging (168 hours at 302° F.) - Against | | | | | |
| Peak stress (MPa) | 11.198 | 13.532 | 13.727 | 14.646 | 13.899 |
| Elongation (%) | 123 | 165 | 174 | 106 | 100 |
| Break stress (MPa) | 11.198 | 13.506 | 13.705 | 14.611 | 13.877 |
| Elongation (%) | 123 | 164 | 174 | 106 | 100 |
| 5% modulus (MPa) | 1.018 | 1.18 | 1.036 | 1.57 | 1.602 |
| 10% modulus (MPa) | 1.789 | 1.845 | 1.735 | 2.66 | 2.726 |
| 15% modulus (MPa) | 2.446 | 2.405 | 2.32 | 3.547 | 3.791 |
| 20% modulus (MPa) | 3.04 | 2.881 | 2.839 | 4.351 | 4.67 |
| 25% modulus (MPa) | 3.576 | 3.33 | 3.289 | 5.07 | 5.52 |
| 50% modulus (MPa) | 6.023 | 5.326 | 5.328 | 8.366 | 8.956 |
| 100% modulus (MPa) | 9.413 | 9.145 | 6.034 | 14.047 | 0 |
| Tensile Test T10 (152 mm/min) | | | | | |
| Peak stress (MPa) | 15.34 | 14.498 | 17.475 | 17.764 | 18.93 |
| Elongation (%) | 29 | 71 | 54 | 43 | 39 |
| Break stress (MPa) | 15.326 | 14.485 | 17.475 | 17.764 | 18.93 |
| Elongation (%) | 32 | 74 | 55 | 42 | 38 |
| 5% modulus | 5.303 | 3.361 | 3.691 | 5.601 | 4.251 |
| 10% modulus | 9.359 | 5.756 | 6.916 | 8.876 | 8.31 |
| 15% modulus | 12.831 | 7.711 | 9.609 | 11.459 | 11.773 |
| 20% modulus | 14.775 | 9.278 | 11.76 | 13.4 | 14.443 |
| 25% modulus | 15.326 | 10.563 | 13.541 | 14.886 | 16.359 |
| 50% modulus | 0 | 13.829 | 17.315 | 0 | 0 |
| Hot Air Aging (168 hours at 302° F.) - With | | | | | |
| Peak stress (MPa) | 16.452 | 15.042 | 18.692 | 19.204 | 20.048 |
| Elongation (%) | 21 | 60 | 45 | 41 | 35 |
| Break stress (MPa) | 16.452 | 15.042 | 18.692 | 19.165 | 19.929 |
| Elongation (%) | 21 | 59 | 45 | 40 | 34 |
| 5% modulus (MPa) | 5.332 | 3.147 | 3.848 | 5.447 | 5.237 |
| 10% modulus (MPa) | 9.331 | 5.479 | 7.101 | 9.479 | 9.029 |
| 15% modulus (MPa) | 13.481 | 7.3551 | 9.644 | 11.867 | 12.098 |
| 20% modulus (MPa) | 16.135 | 8.911 | 11.889 | 13.994 | 14.751 |
| 25% modulus (MPa) | 0 | 10.24 | 13.812 | 15.81 | 16.943 |
| 50% modulus (MPa) | 0 | 14.322 | 0 | 0 | 0 |

Example III

In this example, chopped carbon fibers with and without sizing were evaluated in a peroxide cured EPDM compound. Samples of an EPDM compound were prepared as indicated in Table 5. Samples 1–3 also contained conventional compounding ingredients, e.g. cure coagents, metal oxides, antidegradants, lubricants and peroxide in addition to the ingredients in Table 1. The compositions were identical except for the presence of chopped carbon fiber with sizing in Samples 2 and 3.

The rubber compositions are identified herein as Samples 1 through 3. Samples 2 and 3 are considered herein as representative of the present invention. Sample 1 is considered as the control due to the absence of chopped carbon fiber with sizing.

Samples were prepared following the procedures of Example 1. Physical properties are given in Table 6.

TABLE 5

| Sample | Control 1 | 2 | 3 |
|---|---|---|---|
| EPDM | 100 | 100 | 100 |
| Carbon Black | 21 | 21 | 21 |
| Silica | 25 | 25 | 25 |
| Silane coupling agent | 2 | 2 | 2 |
| Chopped Carbon fiber with sizing[1] | 0 | 10 | 20 |

[1]PX33CF0250-14, 6.35 mm long

TABLE 6

| Sample | Control 1 | 2 | 3 |
|---|---|---|---|
| MDR (30 minutes at 340° F.) | | | |
| Test temperature (° F.) | 340 | 340 | 340 |
| Test time (min) | 30 | 30 | 30 |
| ML (dNm) | 2.21 | 2.39 | 2.46 |
| MH (dNm) | 19.03 | 20.87 | 23.10 |
| Ts1 (min) | 0.5 | 0.5 | 0.47 |
| T90 (min) | 5.63 | 5.69 | 5.40 |
| S' at T90 (dNm) | 17.35 | 19.02 | 21.04 |
| Rh (dNm/min) | 14.23 | 13.91 | 16.31 |
| ASTM D 2240 (20 minutes at 340° F.) | | | |
| Hardness, Shore A | 75 | 84 | 87 |
| Hot Air Aging (168 hours at 275° F.) | | | |
| Hardness, Shore A | 79 | 86 | 89 |
| Hardness (% Retention) | 1.05 | 1.02 | 1.02 |
| Tear Strength, Die C - Against | | | |
| Peak stress (kN/m) | 28.93 | 30.78 | 33.03 |
| Break stress (kN/m) | 28.60 | 30.39 | 14.95 |
| Tear Strength, Die C (20 minutes at 340° F.) | | | |
| Peak stress (kN/m) | 29.73 | 32.71 | 24.89 |
| Break stress (kN/m) | 29.37 | 15.56 | 24.49 |
| Tensile Test T10 (152 mm/minutes; 20 minutes at 340° F.) - Against | | | |
| Peak stress (MPa) | 10.97 | 10.29 | 9.24 |
| Peak strain (%) | 351 | 341 | 315 |
| Break stress (MPa) | 10.96 | 10.29 | 9.21 |
| Elongation (%) | 351.5 | 343 | 317 |
| 5% modulus (MPa) | 0.52 | 0.93 | 0.99 |
| 10% modulus (MPa) | 0.81 | 1.31 | 1.42 |
| 15% modulus (MPa) | 1.02 | 1.63 | 1.75 |
| 20% modulus (MPa) | 1.18 | 1.89 | 2.02 |
| 25% modulus (MPa) | 1.31 | 2.13 | 2.24 |
| 50% modulus (MPa) | 1.78 | 2.9 | 3 |
| 100% modulus (MPa) | 2.72 | 3.97 | 4.18 |
| 200% modulus (MPa) | 5.68 | 6.55 | 7.08 |
| 300% modulus (MPa) | 9.27 | 9.25 | 9.11 |
| Hot Air Aging (168 hours at 275° F.) | | | |
| Peak stress (MPa) | 12.32 | 11.25 | 10.36 |
| Peak strain (%) | 328 | 312 | 265 |
| Break stress (MPa) | 12.28 | 11.22 | 10.35 |
| Elongation (%) | 327 | 310 | 263 |
| 5% modulus (MPa) | 0.59 | 0.84 | 0.87 |
| 10% modulus (MPa) | 0.95 | 1.44 | 1.47 |
| 15% modulus (MPa) | 1.19 | 1.84 | 1.91 |
| 20% modulus (MPa) | 1.38 | 2.18 | 2.25 |
| 25% modulus (MPa) | 1.54 | 2.47 | 2.50 |
| 50% modulus (MPa) | 2.11 | 3.43 | 3.51 |
| 100% modulus (MPa) | 3.38 | 4.84 | 5.15 |
| 200% modulus (MPa) | 7.24 | 7.98 | 8.69 |
| 300% modulus (MPa) | 11.21 | 10.95 | 0 |
| Tensile Test T10 (152 mm/minutes; 20 minutes at 340° F.) | | | |
| Peak stress (MPa) | 9.28 | 11.74 | 11.53 |
| Peak strain (%) | 286 | 339 | 319 |
| Break stress (MPa) | 9.26 | 11.74 | 11.53 |
| Elongation (%) | 286 | 339 | 319 |
| 5% modulus (MPa) | 0.6 | 1.9 | 3.05 |
| 10% modulus (MPa) | 0.89 | 2.92 | 5.11 |
| 15% modulus (MPa) | 1.12 | 3.8 | 6.75 |
| 20% modulus (MPa) | 1.28 | 4.49 | 8.02 |
| 25% modulus (MPa) | 1.43 | 5 | 8.75 |
| 50% modulus (MPa) | 1.97 | 5.81 | 8.63 |
| 100% modulus (MPa) | 3.08 | 5.64 | 7.74 |
| 200% modulus (MPa) | 6.33 | 7.3 | 8.11 |
| 300% modulus (MPa) | 0 | 10.59 | 10.91 |
| Hot Air Aging (168 hours at 275° F.) | | | |
| Peak stress (MPa) | 11.5 | 11.05 | 12.51 |
| Peak strain (%) | 315 | 279 | 38 |
| Break stress (MPa) | 11.46 | 11.02 | 11.53 |
| Elongation (%) | 313 | 278 | 61 |
| 5% modulus (MPa) | 0.7 | 1.87 | 2.92 |
| 10% modulus (MPa) | 1.03 | 3.22 | 5.54 |
| 15% modulus (MPa) | 1.31 | 4.4 | 7.81 |
| 20% modulus (MPa) | 1.51 | 5.46 | 9.71 |
| 25% modulus (MPa) | 1.68 | 6.36 | 11.12 |
| 50% modulus (MPa) | 2.38 | 7.94 | 12.09 |
| 100% modulus (MPa) | 3.94 | 7.84 | 0 |
| 200% modulus (MPa) | 8.21 | 8.91 | 0 |
| 300% modulus (MPa) | 11.08 | 0 | 0 |

Example IV

In this example, chopped carbon fiber with and without sizing were evaluated in a peroxide cured hydrogenated acrylonitrile rubber (HNBR) compound. Samples of an HNBR compound were prepared as indicated in Table 7. Samples 1 through 5 also contained conventional compounding ingredients, e.g. cure coagents, antidegradants, and peroxide in addition to the ingredients in Table 7. The compositions were identical except for the presence of chopped carbon fiber with sizing in Samples 2 through 5.

The rubber compositions are identified herein as Samples 1 through 5. Samples 2 through 5 are considered herein as representative of the present invention. Sample 1 is considered as the control due to the absence of chopped carbon fiber with sizing. Samples were prepared following the procedures of Example 1. Physical properties are given in Table 8.

TABLE 7

| | Control 1 | 2 | 3 | 4 | 5 |
|---|---|---|---|---|---|
| HNBR | 100 | 100 | 100 | 100 | 100 |
| Carbon Black | 30 | 30 | 30 | 30 | 30 |
| Chopped carbon fiber with sizing[1] | 0 | 10 | 20 | 0 | 0 |
| Chopped carbon fiber with sizing[2] | 0 | 0 | 0 | 10 | 20 |

[1]Panex PX33CF0125-14, 3.2 mm long
[2]Panex PX33CF0250-14, 6.35 mm long

TABLE 8

| | Control 1 | 2 | 3 | 4 | 5 |
|---|---|---|---|---|---|
| MDR (30 minutes at 340° F.) | | | | | |
| Test temperature | 340 | 339.9 | 339.9 | 339.9 | 340.1 |
| Test time (minutes) | 30 | 30 | 30 | 30 | 30 |
| ML (dNm) | 1.62 | 1.89 | 2.20 | 1.78 | 2.41 |
| MH (dNm) | 70.79 | 53.95 | 51.57 | 57.54 | 58.65 |
| Ts1 (minutes) | 0.44 | 0.48 | 0.47 | 0.49 | 0.45 |
| T90 (min) | 13.16 | 14.49 | 14.77 | 14.42 | 14.5 |
| S' at T90 (dNm) | 63.87 | 48.74 | 46.63 | 51.96 | 53.03 |
| Rh (dNm/minutes) | 20.26 | 12.70 | 11.23 | 14.08 | 14.38 |
| RPA Temperature Sweep Norm | | | | | |
| TS S' 180 (N-m) | 2.21 | 2.88 | 2.31 | 2.82 | 0 |
| TS S' 200 (N-m) | 1.52 | 2.02 | 1.86 | 2.03 | 0 |
| TS S' 240 (N-m) | 0.87 | 1.16 | 1.09 | 1.18 | 0 |
| TS S' 260 (N-m) | 0.68 | 0.85 | 0.81 | 0.88 | 0 |
| TS S' 270 (N-m) | 0.64 | 0.79 | 0.76 | 0.82 | 0 |

TABLE 8-continued

|  | Control 1 | 2 | 3 | 4 | 5 |
|---|---|---|---|---|---|
| TS S' 280 (N-m) | 0.70 | 0.82 | 0.82 | 0.86 | 0 |
| TS Tan D 180 (°) | 0.61 | 0.66 | 0.68 | 0.59 | 0 |
| TS Tan D 200 (°) | 0.71 | 0.74 | 0.77 | 0.69 | 0 |
| TS Tan D 240 (°) | 0.86 | 0.88 | 0.91 | 0.82 | 0 |
| TS Tan D 260 (°) | 0.92 | 0.95 | 0.98 | 0.89 | 0 |
| TS Tan D 270 (°) | 0.94 | 0.96 | 0.99 | 0.91 | 0 |
| TS Tan D 280 (°) | 0.91 | 0.94 | 0.95 | 0.88 | 0 |
| Hardness (30 minutes at 340° F.) | | | | | |
| Shore D (° Sh. D) | 56 | 55 | 60 | 60 | 61 |
| Hot Air Aging (168 hours at 275° F.) | | | | | |
| Hardness (° Sh. D) | 70 | 70 | 70 | 70 | 70 |
| Hardness change | 14 | 15 | 10 | 10 | 9 |
| Tear Strength, Die C Norm - Against (30 minutes at 340° F.) | | | | | |
| Peak stress (kN/m) | 53.33 | 42.47 | 38.01 | 46.85 | 40.33 |
| Break stress (kN/m) | 30.47 | 26.25 | 24.56 | 31.89 | 24.97 |
| Tear Strength, Die C Norm (30 minutes at 340° F.) | | | | | |
| Peak stress (kN/m) | 55.81 | 63.94 | 67.66 | 73.17 | 75.47 |
| Break stress (kN/m) | 36.07 | 51.85 | 53.44 | 43.82 | 73.52 |
| Tensile test T10 (152 mm/minutes) - Against (30 minutes at 340° F.) | | | | | |
| Peak stress (MPa) | 18.86 | 16.84 | 15.91 | 15.81 | 17.11 |
| Peak strain (%) | 191 | 184 | 159 | 143 | 161 |
| Break stress (MPa) | 18.84 | 16.82 | 15.91 | 15.81 | 17.1 |
| Elongation (%) | 191 | 184 | 159 | 144 | 161 |
| 5% modulus (MPa) | 3.53 | 3.42 | 3.12 | 4.51 | 4.02 |
| 10% modulus (MPa) | 5.37 | 4.91 | 4.87 | 6.31 | 6.08 |
| 15% modulus (MPa) | 6.44 | 5.84 | 5.91 | 7.46 | 7.33 |
| 20% modulus (MPa) | 7.15 | 6.51 | 6.63 | 8.25 | 8.16 |
| 25% modulus (MPa) | 7.67 | 7.04 | 7.20 | 8.78 | 8.83 |
| 50% modulus (MPa) | 9.49 | 9.05 | 9.34 | 10.67 | 10.97 |
| 100% modulus (MPa) | 13.02 | 12.41 | 12.64 | 13.52 | 14.03 |
| Hot Air Aging (168 hours at 275° F.) | | | | | |
| Peak stress (MPa) | 22.49 | 19.02 | 17.35 | 21.56 | 19.2 |
| Peak strain (%) | 60 | 49 | 32 | 51 | 35 |
| Break stress (MPa) | 22.12 | 18.68 | 16.94 | 21.21 | 18.83 |
| Elongation (%) | 58 | 47 | 29 | 48 | 33 |
| 5% modulus (MPa) | 4.95 | 6.41 | 5.63 | 6.03 | 7.02 |
| 10% modulus (MPa) | 10.23 | 10.47 | 10.11 | 11.91 | 12.24 |
| 15% modulus (MPa) | 12.94 | 12.70 | 12.87 | 15.04 | 14.97 |
| 20% modulus (MPa) | 14.98 | 14.41 | 14.65 | 16.78 | 16.56 |
| 25% modulus (MPa) | 16.35 | 15.61 | 15.99 | 17.98 | 17.37 |
| 50% modulus (MPa) | 21.10 | 0 | 0 | 0 | 0 |
| Tensile test T10 (152 mm/minute; 30 minutes at 340° F.) | | | | | |
| Peak stress (MPa) | 20.34 | 17.67 | 25.38 | 18.31 | 26.44 |
| Peak strain (%) | 199 | 151 | 26 | 32 | 27 |
| Break stress (MPa) | 20.34 | 17.6 | 24.84 | 18.11 | 26.25 |
| Elongation (%) | 199 | 155 | 28 | 160 | 31 |
| 5% modulus (MPa) | 3.61 | 7.11 | 12.51 | 8.75 | 10.17 |
| 10% modulus (MPa) | 5.45 | 11.10 | 18.37 | 13.07 | 17.44 |
| 15% modulus (MPa) | 6.56 | 13.87 | 22.44 | 15.72 | 22.15 |
| 20% modulus (MPa) | 7.26 | 15.80 | 24.57 | 17.26 | 25.06 |
| 25% modulus (MPa) | 7.83 | 16.78 | 25.29 | 18.00 | 26.27 |
| 50% modulus (MPa) | 9.81 | 17.38 | 0 | 18.12 | 0 |
| 100% modulus (MPa) | 13.7 | 17.11 | 0 | 17.59 | 0 |
| Hot Air Aging (168 hours at 275° F.) | | | | | |
| Peak stress (MPa) | 23.67 | 29.19 | 39.08 | 32.62 | 43.2 |
| Peak strain (%) | 58 | 20 | 11 | 18 | 14 |
| Break stress (MPa) | 23.29 | 28.85 | 34.99 | 31.17 | 40.92 |
| Elongation (%) | 55 | 18 | 9 | 15 | 12 |
| 5% modulus (MPa) | 5.55 | 9.77 | 21.67 | 14.59 | 21.62 |
| 10% modulus (MPa) | 10.49 | 20.42 | 0 | 25.72 | 37.96 |
| 15% modulus (MPa) | 13.47 | 25.5 | 0 | 0 | 0 |
| Comp Set (70 hours at 275° F.) (45 minutes at 340° F.) | | | | | |
| Comp set (%) | 66 | 60.5 | 66 | 49.10 | 54.50 |

While present exemplary embodiments of this invention and methods of practicing the same have been illustrated and described, it will be recognized that this invention may be otherwise variously embodied and practiced within the scope of the following claims.

What is claimed is:

1. An endless power transmission belt having
   (1) a tension section;
   (2) a cushion section; and
   (3) a load-carrying section disposed between said tension section and cushion section, and the belt containing an elastomeric composition comprising
      (a) a cross-linked rubber; and
      (b) from 5 to 60 phr of chopped carbon fibers that have a sizing agent applied to the surface of the fibers.

2. The endless power transmission belt of claim 1 wherein said cross-linked rubber is selected from the group consisting of an ethylene alpha olefin elastomer, silicone rubber, polychloroprene, polybutadiene, epichlorohydrin, acrylonitrile rubber, hydrogenated acrylonitrile rubber, zinc salts of unsaturated carboxylic acid ester grafted hydrogenated nitrile butadiene elastomer, natural rubber, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, poly-acrylic rubber, and mixtures thereof.

3. The endless power transmission belt of claim 1 wherein said sizing agent is selected from the group consisting of epoxy resins, urethane modified epoxy resins, polyester resins, phenol resins, polyamide resins, polyurethane resins, polycarbonate resins, polyetherimide resins, polyamideimide resins, polystylylpyridine resins, polyimide resins, bismaleimide resins, polysulfone resins, polyethersulfone resins, epoxy-modified urethane resins, polyvinyl alcohol resins, polyvinyl pyrolidene resins and mixtures thereof.

4. The endless power transmission belt of claim 1 wherein the amount of the sizing agent on the chopped carbon fiber ranges from 1 percent to 10 percent by weight of the chopped fiber.

5. The endless power transmission belt of claim 3 wherein said sizing agent is an epoxy resin.

6. The endless power transmission belt of claim 2 wherein the amount of chopped carbon fibers ranges from 5 to 35 phr.

7. The endless power transmission belt of claim 4 wherein the amount of the sizing agent on the chopped carbon fiber ranges from 3 to 8 percent by weight.

8. The endless power transmission belt of claim 1 wherein said sizing agent is selected from the group consisting of thermoplastic resins, thermosetting resins and mixtures thereof.

9. The endless power transmission belt of claim 1 wherein the diameter of the chopped carbon fibers range from 0.001 to 0.05 mm.

10. The endless power transmission belt of claim 1 wherein the length of the chopped carbon fibers range from 0.5 to 75 mm.

11. The endless power transmission belt of claim 1 wherein said rubber is selected from the group consisting of ethylene alpha olefin elastomer, hydrogenated acrylonitrile rubber, natural rubber, polybutadiene and styrene-butadiene rubber.

12. The endless power transmission belt of claim 1 wherein said elastomer composition is in the cushion section of the belt.

13. The endless power transmission belt of claim 1 wherein said elastomer composition is in the load-carrying section of the belt.

14. The endless power transmission belt of claim 1 wherein said elastomer composition is in the tension section of the belt.

15. The endless power transmission belt of claim 1 wherein said elastomeric composition comprises EPDM.

16. The endless power transmission belt of claim 1 wherein said elastomeric composition comprises hydrogenated acrylonitrile rubber.

17. The endless power transmission belt of claim 1 wherein said elastomeric composition comprises styrene-butadiene rubber.

18. The endless power transmission belt of claim 1 wherein said elastomeric composition comprises natural rubber.

* * * * *